June 14, 1966　　　E. P. KUHLMANN　　　3,256,452
COMBINED FINE-ADJUSTING AND ELECTRICAL-INSULATING
MOTOR MOUNTING MEANS
Filed Nov. 26, 1963　　　　　　　　　3 Sheets-Sheet 2

INVENTOR
EMIL P. KUHLMANN
BY
HIS ATTORNEYS

June 14, 1966  E. P. KUHLMANN  3,256,452
COMBINED FINE-ADJUSTING AND ELECTRICAL-INSULATING
MOTOR MOUNTING MEANS
Filed Nov. 26, 1963  3 Sheets-Sheet 3
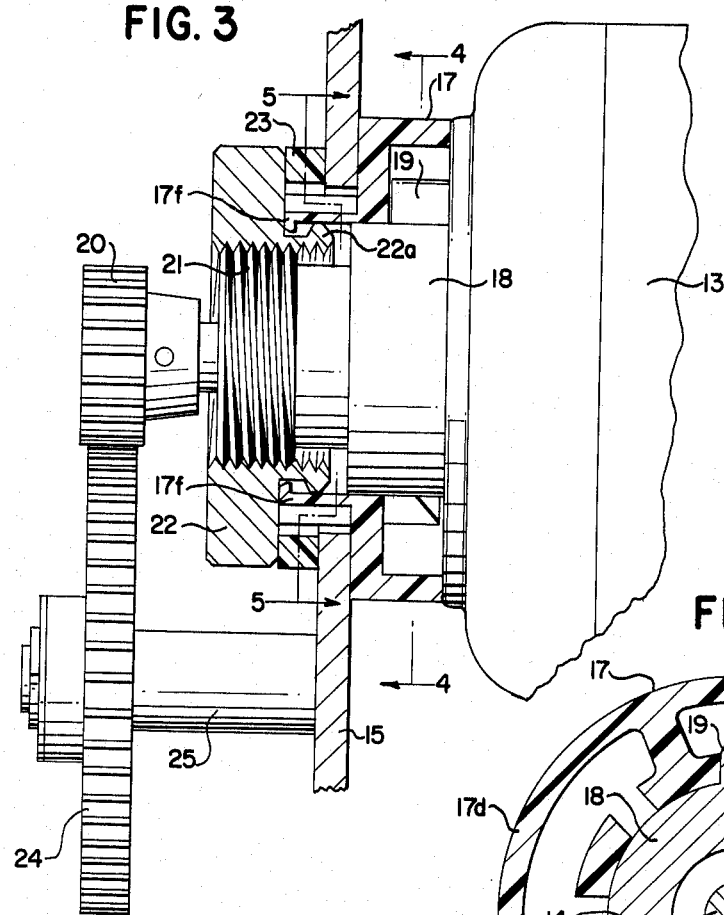
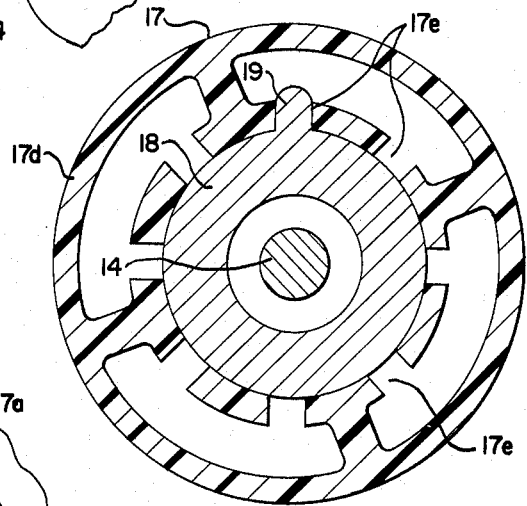
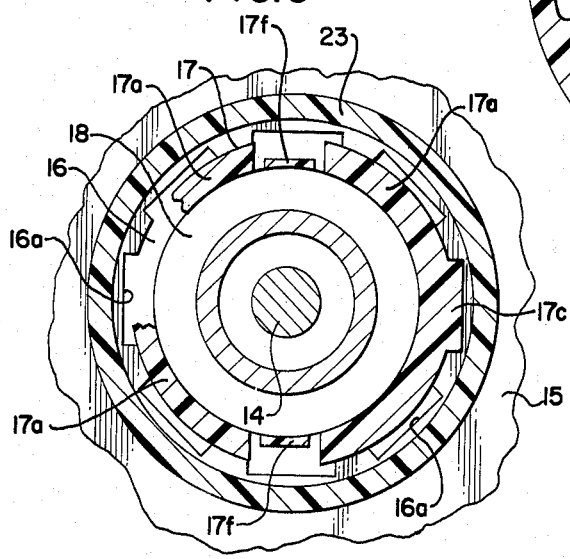
INVENTOR
EMIL P. KUHLMANN
BY
HIS ATTORNEYS United States Patent Office 3,256,452
Patented June 14, 1966

3,256,452
COMBINED FINE-ADJUSTING AND ELECTRICAL-INSULATING MOTOR MOUNTING MEANS
Emil Paul Kuhlmann, Westheim, near Augsburg, Germany, assignor to The National Cash Register Company, Dayton, Ohio, a corporation of Maryland
Filed Nov. 26, 1963, Ser. No. 325,957
Claims priority, application Germany, Nov. 27, 1962, N 22,409
11 Claims. (Cl. 310—91)

This invention relates generally to improved means for mounting an electric motor in machines in general, and more particularly relates to such an improved means both permitting quick and easy tooth-mesh adjustment between the usual motor carried driving gear and any gear associated therewith and caused to be driven thereby and also providing a complete electrical insulation between the motor itself and the machine framework supporting same.

For the sake of present description, the improved motor mounting means is herein disclosed as being incorporated in the overall construction of a cash register; however same, of course, may be just as well adapted to use in any other machine having its operating mechanisms receive their driving power from an electric motor. Furthermore, while the instant motor mounting means is herein disclosed in conjunction with an electric motor of the gear-drive type—that is, permitting the above-mentioned tooth-mesh adjustment between same and an associated driven gear, it is axiomatic that such invention may be equally well adapted for use with motors of the pulley-drive type, where belt tensioning may be quickly and easily adjusted between the sheave of the driving motor and the associated sheave caused to be driven thereby.

With the above discussion in mind, it is clear that the primary object of the instant invention is actually two-fold—of providing novel mounting means adapted to electrically insulate the drive motor from the particular machine to which it is applied and, while so doing, be likewise adaptable for accurately adjusting the motor carried driving member with respect to that power transmitting member first caused to be driven thereby.

Further important objects of the instant invention reside in the provision of such a dual-purpose motor mounting means of extremely simple construction, of extremely simple operation, and one which may be employed for its intended usage without the need of any special tools and the like. In this regard, it will be seen from the following description that the instant mounting means is, in addition to the motor per se, made up of but four different elements, each of which is especially designed to interconnect and be associated with the other, all without the use of bolts, screws, or any other means more or less permanently affixing same to the machine proper.

With these and incidental objects in view, the invention includes certain novel features of construction and combinations of parts, a preferred form or embodiment of which is hereinafter described with reference to the drawings which accompany and form a part of this specification.

In the drawings:

FIG. 3 is a sectional view in side elevation showing those elements of FIG. 1 in their motor fixing and insulating position;

FIG. 4 is a view in section taken generally along line 4—4 in FIG. 3; and

FIG. 5 is a view in section taken generally along line 5—5 in FIG. 3.

Figure 1:
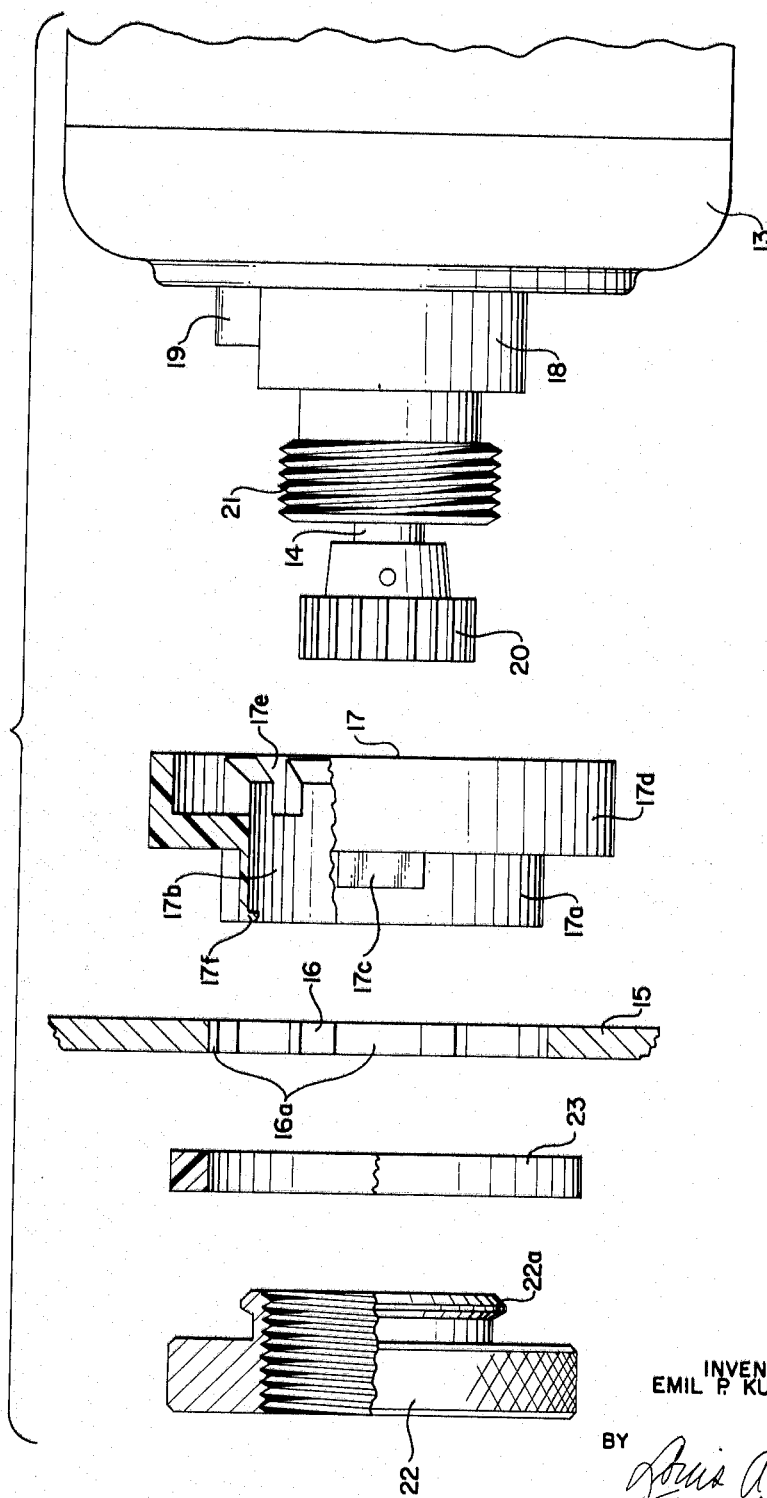
FIG. 1 is a schematic representation in partial section of the various elements going to make up the instant invention.
Figure 2:
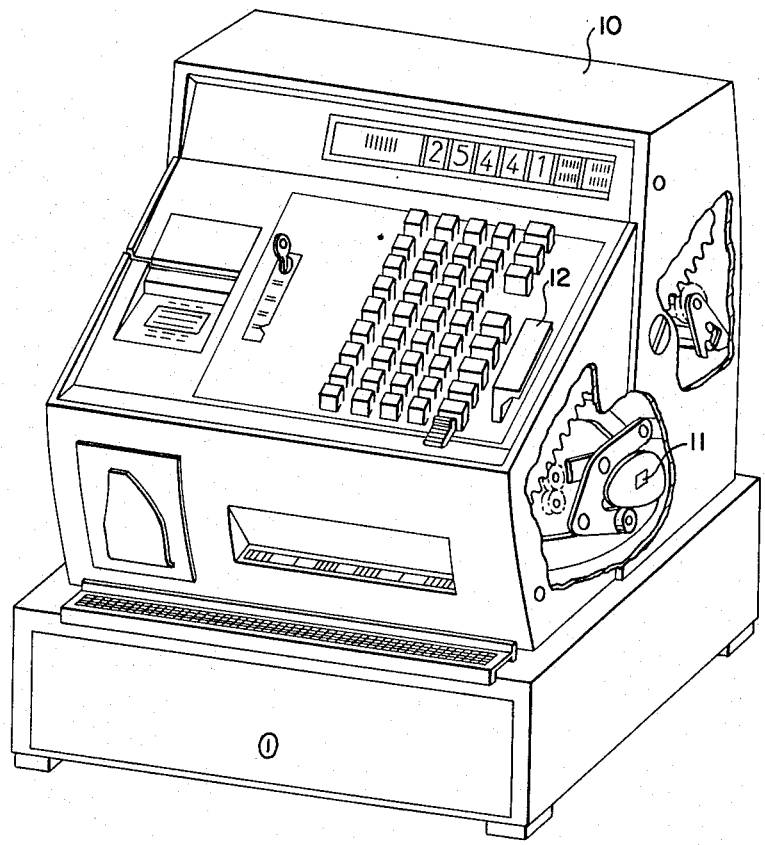
FIG. 2 is a front perspective view of a representative type of machine which might normally embody the instant invention, being specifically a cash register in this instance.

As shown in FIG. 2, the representative machine chosen to include the present invention is housed in a suitable cabinet 10 and has, although not illustrated herein, the usual framework construction which includes a lower base member supporting a pair of upstanding right and left side frames, within which side frames is journaled a main cam line 11. As is known, machine operation is through depression of a motor bar 12, which energizes a motor 13 (FIGS. 1 and 3) appropriately interconnected (by means of gears, pulleys, etc.) so as to cycle the main cam line 11. For the particular machine hereof, the motor 13 is located rearwardly and somewhat downwardly of the main cam line 11 and is, as will soon be understood, supported by the lower rear corner portion of the above-mentioned right side frame (designated as 15 in both FIGS. 1 and 3).

As best understood from FIG. 5, the side frame 15, at such zone of motor mounting, is provided with what may be defined as a splined or keyed aperture 16 therethrough—that is, being a round hole with a plurality of spaced-apart notches or slots 16a around and within its periphery. While any convenient number of such slots 16a may be provided, the present disclosure makes use of eight in number with two each on the respective horizontal and vertical center lines of such aperture 16.

Extending through the aperture 16 is a minor-diameter portion 17a of an insulating and adjusting member 17, which portion 17a of such member 17 has the same outer diameter as such aperture 16 while having an inner bore 17b therethrough eccentrical with respect thereto. That is, as the insulating and adjusting member 17 is caused to be rotated within the aperture 16, the central bore 17b thereof continually changes its position with respect to the center line of such aperture 16. Integral with the member 17 is a fixing lug 17c which, as understood from FIG. 5, may be received within any one of the plurality of notches 16a provided around the side frame aperture 16. When this is done, it is clear, the insulating and adjusting member 17 is positively fixed against rotation within such aperture 16 and, as determined by the slot or notch 16a selected for receiving the fixing lug 17c, the inner bore 17b of such member 17 is precisely located at a selected position within the aperture 16. Such selected position, of course, may be quickly and easily changed by removing the fixing lug 17c from one notch 16a and presenting same within any one of such other like notches 16a.

As best understood from FIG. 1, as the minor-diameter portion 17a is inserted fully within the aperture 16, a major-diameter portion 17d of the insulating and adjusting member 17 abuts against the side frame 15—that is, comes to rest against that area of the side frame adjacent the aperture 16 therethrough (see also FIG. 3). A plurality of integral notches 17e surround the internal surface of the major-diameter portion 17d of such member 17, each of which is of that width to slidingly receive a motor carried fixing lug 19 therewithin (see FIGS. 1 and 4). The fixing lug 19 itself is an integral part of a motor mounting nose 18 of that diameter to slidingly enter within the insulating and adjusting member inner bore 17b; hence permitting the motor 13 to both be fixed rotatably within the insulting and adjusting member 17 and be spaced a distance from the machine framework side frame 15, as the lug 19 enters within the receiving notch 17e and the front surface of the motor 13 itself is moved against the rear surface of the insulating and adjusting member major-diameter portion 17d (FIG. 3). While a single notch 17e only is needed for rotatably fixing such motor 13 within the member 17, it is clear that any rotation of such member 17 within its aperture 16 (for readjusting the inner bore 17b thereof via the moving of its fixing lug 17c from one notch 16a to another) will cause such one notch 17e to be shifted in location each and every time the motor 13 is being applied to the machine. This, in effect, requires the assemblyman or serviceman performing the motor mounting task to perhaps have to rotate the motor 13 a great number of degrees before the lug 19 thereof is actually aligned with the receiving notch 17e. To overcome this problem, there is likewise provided eight of such notches 17e spaced around the insulating and adjusting member major-diameter portion 17d (FIG. 4), which insures notch 17e and lug 19 alignment with never any more than forty-five degrees rotation of the motor 13 needed.

Affixed to the outer end of the motor carried drive shaft 14 is the usual driving member 20 which transmits cycling motion to the various operating mechanisms employed in the machine to which the instant invention is applied. Surrounding such drive shaft 14 is a screw-threaded nipple 21, which nipple 21 is fixedly positioned between the motor mounting nose 18 and the motor driving member 20, and which nipple 21, along with such driving member 20, are of that diameter to fit freely within and through the inner bore 17b of the insulating and adjusting member 17 (FIG. 3). While this is true—that is, both the driving member 20 and the nipple 21 are each of a lesser diameter than that of the inner bore 17b, the driving member 20 is likewise of a lesser diameter than such nipple 21 in order that a locking nut 22 may be freely received thereover and screw-threadedly engaged with such nipple 21. When this is done, and such locking nut 22 is caused to be tightened, it is clear that the motor 13 is thereby pulled up agaist the insulating and adjusting member 17 and such member 17 pulled up against the side frame 15, the motor 13 being fixed against rotation within such member 17 by its lug 19 entering within the selected notch 17e and the member 17 being fixed against rotation within the side frame 15 by its lug 17c fitting within the selected aperture notch 16a. Positioned between the locking nut 22 and such side frame 15, on the side opposite that which receives the member 17, is a ring washer 23 of that internal diameter slightly greater than the notched aperture 16 (FIG. 5) and of that thickness which insures that the locking nut 22 does not come into contact with the side frame 15 (FIG. 3).

As best understood from FIG. 1, the nipple engaging end of the locking nut 22 is provided with a peripheral flange 22a which engages behind the forward nose portion of each of a pair of diametrically opposed retaining fingers 17f provided integral with the insulating and adjusting member minor-diameter portion 17a (see also FIGS. 3 and 5). As illustrated in FIG. 3, the diameter of such locking nut peripheral flange 22a is approximately that of the insulating and adjusting member inner bore 17b; hence permitting such peripheral flange to be slidingly received within such inner bore, whereas the retaining fingers 17f have their forward nose portions of that thickness to extend normally within the diameter of such inner bore. In applying the locking nut 22, as can be understood from FIG. 1, the peripheral flange 22a thereof first springs each of such retaining fingers 17f slightly outwardly and thence becomes retained behind the finger nose portions as the nut 22 is moved inwardly to that extent permitting the fingers 17f to return to normal. When this is done (FIG. 3), the locking nut 22 is effectively coupled with the insulating and adjusting member 17 and can remain so even though the motor 13 is, for maintenance and the like, caused to be removed from the machine proper. Essentially, this flange and finger arrangement permits the locking nut 22 to be snapped within the insulating and adjusting member 17 prior to receipt of the motor mounting nose 18 within the inner bore 17b thereof, all being done simply by the forcing of the locking nut peripheral flange 22a beyond the forward nose portion of each retaining finger 17f. Of course, removal of the locking nut 22 from the member 17 is accomplished in a reverse manner—simply by pulling same outwardly until the peripheral flange 22a thereof again passes by the forward nose portions of the several fingers 17f. As illustrated in FIG. 1, each side surface of the peripheral flange 22a is appropriately bevelled so as to effect the outward springing of the retaining fingers 17f in each instance—that is, both when the locking nut 22 is moved inwardly to a coupling position with respect to the insulating and adjusting member 17 and when same is moved outwardly to an uncoupling position with respect thereto.

With the overall combination of elements just described, an excellent means is provided for supporting the motor 13 solely by one side frame 15 of the machine using same. Furthermore, the motor 13 so supported can be selectively shifted with respect to the axial center line of the aperture 16 through the side frame 15, being thus precisely adjusted with respect to the machine carried driven member first caused to receive movement therefrom. For the sake of the present disclosure, the driving member 20 on the motor shaft 14 is in the form of a gear or pinion intermeshing with a companion gear 24 supported rotatably on a stud 25 fixed in the side frame 15 (FIG. 3). In this instance, precise tolerances between the meshing of the teeth of the several members 20 and 24 can be initially had during motor assembly and continually maintained throughout machine use, all in the following quick and simple manner.

As is known, tightening of the locking nut 22 fixes the machine motor 13 securely within the inner bore 17b of the insulating and adjusting member 17 and such member 17 securely at a set position within the side frame aperture 16. In view of the eccentricity of such inner bore 17b, the particular notch 16a of such aperture 16 selected for receiving the fixing lug 17c of such insulating and adjusting member 17 will of course determine the distance between centers of the fixed gear 24 and the driving pinion 20. If such between-center distance is desired to be changed (either increased or decreased as a better tooth mesh might require), removal of the locking nut 22 from its screw-threaded engagement with the motor nipple 21 will permit the motor 13 to be pulled outwardly from the insulating and adjusting member 17. Further removal of such locking nut 22 from the member 17 itself will permit same to be readjusted within the aperture 16—that is, be pulled slightly outwardly, rotated a desired amount in either a center-distance increasing or decreasing direction, and thence be rotatably fixed thereat as its fixing lug 17c is entered within a new notch 16a. After this has been done, the motor 13 may be returned to the insulating and adjusting member 17 and the locking nut 22 applied thereto as described above.

Should removal of the motor 13 from the machine be for reasons other than changing the mesh between the several members 20 and 24, such as for cleaning or servicing same, it is clear that the locking nut 22 does not then have to be uncoupled from the insulating and adjusting member 17; hence, enabling each element of the instant motor mounting means to remain in place on the framework side frame 15. It is only when the member 17 must be changed rotatably within the side frame aperture 16 that the locking nut 22 must be removed therefrom. This, it is clear, enables the overall assemblage of the various elements herein described to be mounted on the side frame 15 at some stage in overall machine assembly prior to motor attachment.

As illustrated in FIGS. 1 and 3, both the insulating and adjusting member 17 and the ring washer 23 are designated as being made of a plastic or like dielectric material. This, as is clear from FIG. 3, insulates both the motor 13 and the locking nut 22 from the machine framework side frame 15 and, if the companion gear 24 is likewise made of a material of similar type (being usually fiber for noise reduction purposes), a complete electrical insulation between the machine proper and its driving motor 13 is had.

As mentioned previously, the instant invention may be used just as well for machines of the pulley-drive type to maintain adequate belt tensioning between the driving member 20 and a companion sheave. This is likewise true with respect to sprocket-drive type machines for maintaining proper chain tension with respect to a driving member 20 of the sprocket configuration.

While the form of the present invention as herein shown and described is admirably adapted to fulfill the objects primarily stated, it is to be understood that it is not intended to confine the invention to that one form of embodiment precisely disclosed, for it is susceptible of embodiment in various other forms, all coming within the scope of the following claims.

What is claimed is:

1. In combination with an electric motor having a mounting nose and a forward retaining nipple, a motor supporting frame plate; an aperture through said frame plate; a flanged member having one diameter portion extending slidingly through said aperture and another diameter portion abutting one side of the frame plate adjacent said aperture; a bore through said flanged member eccentric to the said one diameter portion thereof; said bore being of that size receiving freely the motor carried retaining nipple therethrough and of that shape receiving slidingly the motor carried mounting nose therewithin; means for fixing the flanged member against rotation within said aperture when the eccentric bore thereof has been adjusted to a desired radial position with respect to the axial center line of said frame plate aperture; and a nipple engaging locking nut abutting the other side of the frame plate adjacent said aperture for maintaining the flanged member within said aperture and the motor carried mounting nose within said flanged member.

2. The structure of claim 1 in which said flanged member fixing means comprises a plurality of key slots around said frame plate aperture, and a corresponding lug member on said one diameter portion for selective engagement therewith.

3. The combination of claim 1 including means for removably coupling the locking nut and the flanged member one diameter portion, whereby said flanged member and said locking nut may be interconnected to the motor supporting frame plate prior to receipt of the motor mounting nose within the flanged member bore.

4. The structure of claim 2 in which said flanged member other diameter portion is provided with a plurality of notches therearound; and said motor mounting nose is provided with a notch engaging lug for fixing the motor against rotation with respect to said flanged member.

5. Mounting means for an electric motor having a drive member for imparting operating movement to a first driven member of a machine, said machine having an overall framework construction including at least one motor supporting frame plate, said motor having a mounting nose capable of supporting the overall weight thereof, and said motor having a fixing nipple intermediate said drive member and said mounting nose, comprising an aperture through the frame plate; a plurality of circumferential notches around said aperture; an insulating and adjusting member having one diameter portion adapted to extend slidingly through said aperture and another diameter portion adapted to both abut the frame plate adjacent said aperture and the motor adjacent the mounting nose thereof; an eccentric bore through said insulating and adjusting member one diameter portion; said bore being of that diameter to receive freely both said motor carried drive member and fixing nipple therethrough and receive slidingly said motor mounting nose therewithin; a lug on said one diameter portion adapted to engage any one of said circumferential notches for fixing the insulating and adjusting member at any desired rotary position within said aperture, whereby, due to the eccentricity of the motor mounting nose receiving bore thereof, the motor carried drive member can be shifted relative to the machine first driven member and accurately adjusted to a fixed position with respect thereto; and a locking nut adapted to screw-threadedly engage the motor carried fixing nipple and seat against the other side of the frame plate adjacent said aperture for retaining the motor mounting nose firmly within the bore of said insulating and adjusting member and the one diameter portion of said insulating and adjusting member at its selected rotary position within the frame plate aperture.

6. The mounting means of claim 5 in which said insulating and adjusting member is made of an electric current non-conducting material; and there is provided a further member of electric current non-conducting material inserted between the locking nut and the frame plate so as to provide complete electrical insulation between the motor and the machine.

7. The mounting means of claim 5 including coupling means between said insulating and adjusting member and said locking nut, whereby the one diameter portion of said insulating and adjusting member may be inserted through the frame plate aperture and said locking nut interconnected therewith prior to assembly of the machine motor.

8. The mounting means of claim 5 in which the nipple engaging end of said locking nut is provided with a peripheral flange therearound; and flange engaging means is provided on the one diameter portion of said insulating and adjusting member so that, should the locking nut be unscrewed from the nipple and the motor mounting nose be removed from the insulating and adjusting member bore, said locking nut and said insulating and adjusting member will remain attached to the motor supporting frame plate.

9. The mounting means of claim 5 in which a dielectric washer is interposed between said locking nut and said frame plate; said insulating and adjusting member is made of a dielectric material; and said locking nut slidingly engages said motor nose receiving bore when screw-threadedly engaging said motor carried fixing nipple, whereby complete electrical isolation exists between said motor and said frame plate.

10. The mounting means of claim 6 in which the nipple engaging end of said locking nut is provided with a peripheral flange therearound; said further member comprises a ring washer engaging freely over the one diameter portion of said insulating and adjusting member; and flange engaging fingers are provided on the one diameter portion of said insulating and adjusting member for maintaining the assemblage of said insulating and adjusting member, said ring washer, and said locking nut coupled to the motor supporting frame plate.

11. The mounting means of claim 8 in which said flange engaging means comprises a pair of resilient retaining fingers each having a forward nose portion normally aligned in the path of travel of said locking nut peripheral flange; and said locking nut peripheral flange is appropriately bevelled so that, when forced against the forward nose portions, said retaining fingers will be yielded thereby and permit the flange to move therepast before returning to normal.

References Cited by the Examiner

FOREIGN PATENTS 526,226    5/1931    Germany.

MILTON O. HIRSHFIELD, *Primary Examiner.*

J. W. GIBBS, *Assistant Examiner.*